United States Patent [19]

Drlik

[11] Patent Number: 4,991,258

[45] Date of Patent: Feb. 12, 1991

[54] EYEGLASS SPRING HINGES

[75] Inventor: Günther Drlik, Pforzheim, Fed. Rep. of Germany

[73] Assignee: OBE-Werk Ohnmacht & Baumgartner GmbH & Co. KG, Ispringen, Fed. Rep. of Germany

[21] Appl. No.: 555,086

[22] Filed: Jul. 18, 1990

[30] Foreign Application Priority Data

Nov. 4, 1989 [DE] Fed. Rep. of Germany ....... 3936725
Mar. 14, 1990 [DE] Fed. Rep. of Germany ....... 4008086

[51] Int. Cl.$^5$ .............................................. G02C 5/22
[52] U.S. Cl. ..................................... 16/228; 351/113; 351/153
[58] Field of Search ................... 16/228; 351/113, 153

[56] References Cited

U.S. PATENT DOCUMENTS

| 4,351,086 | 9/1982 | Drlik | 16/228 |
| 4,617,698 | 10/1986 | Drlik | 16/228 |
| 4,674,147 | 6/1987 | Drlik | 16/228 |

FOREIGN PATENT DOCUMENTS 2115596  10/1972  Fed. Rep. of Germany ...... 351/113

Primary Examiner—Richard K. Seidel
Assistant Examiner—Carmine Cuda
Attorney, Agent, or Firm—Dvorak and Traub

[57] ABSTRACT

This invention relates to eyeglasses comprising spring hinges which permit the bows of the eyeglasses to be forcibly swung out beyond open positions which are defined by stops so that the bows can resiliently bear on the head of the wearer. The spring hinges may provide for a snap action on the bows as they are moved between their swung-in and their open positions. For making each of the hinges, a preassembled unit is provided, which comprises a rim-side hinge eye connected to a slider, which contains a spring-biased plunger, a spring and a locking member. The slider of the preassembled unit is adapted to be inserted into a receptacle provided at the forward end portion of the associated bow and is adapted to be locked in the receptacle by the locking member. The locking member is provided at both ends with beveled end faces. The spring-biased plunger engages the rear end face of the locking member and is adapted to urge the forward end of the locking member upwardly so that it can snap into a recess formed in the guide housing. In the slider the spring is held in a longitudinal slot, into which the spring, the spring-biased plunger and the locking member can be inserted to provide the preassembled unit.

18 Claims, 4 Drawing Sheets

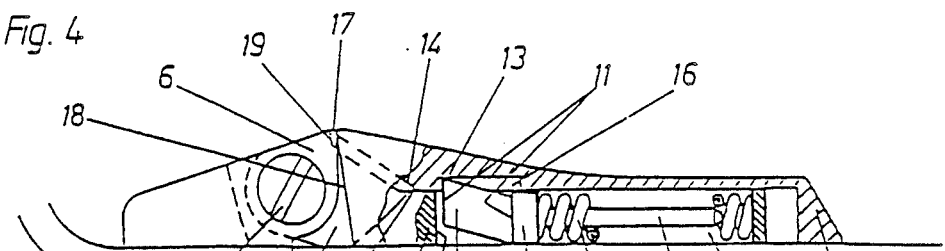
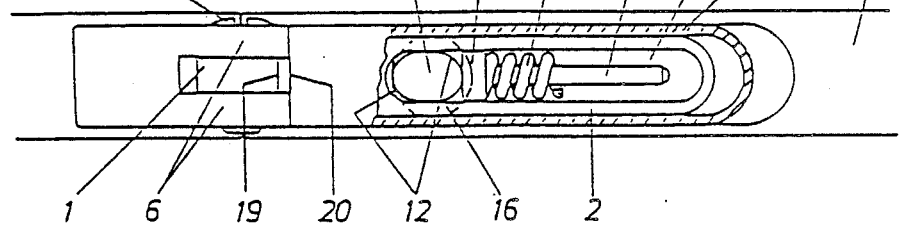
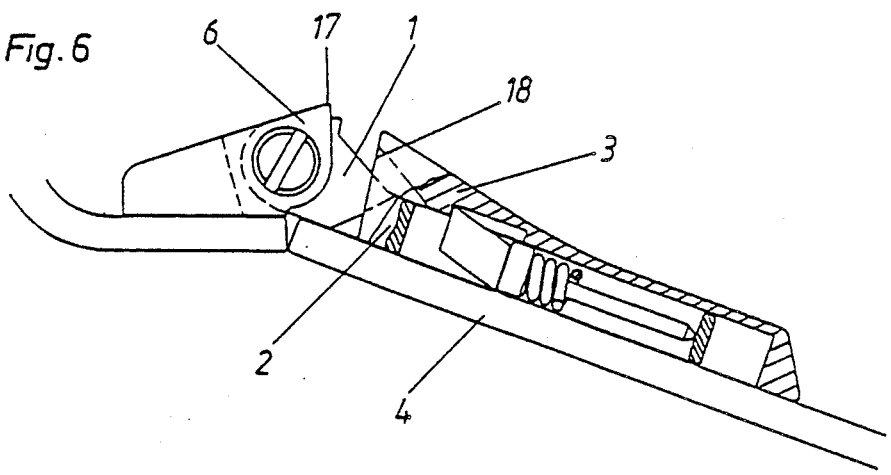
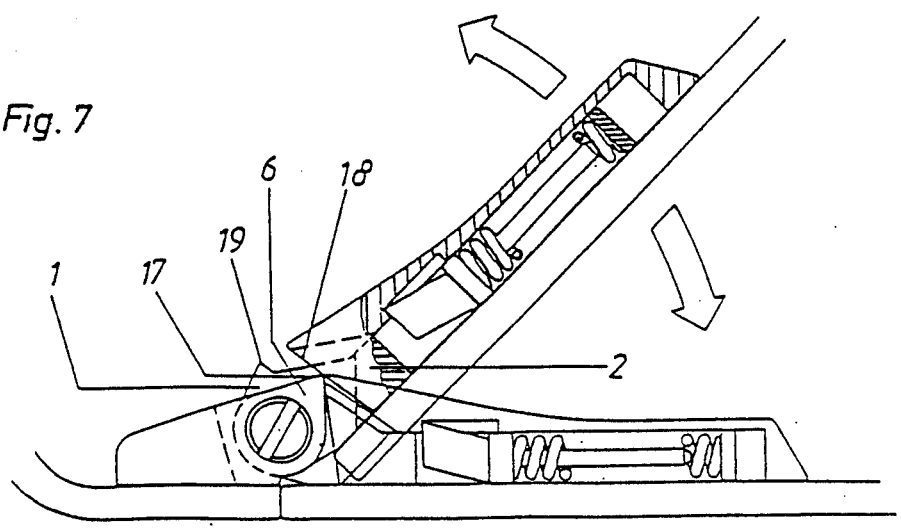

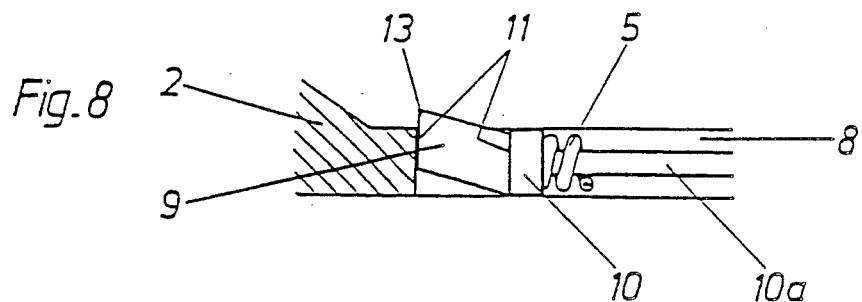
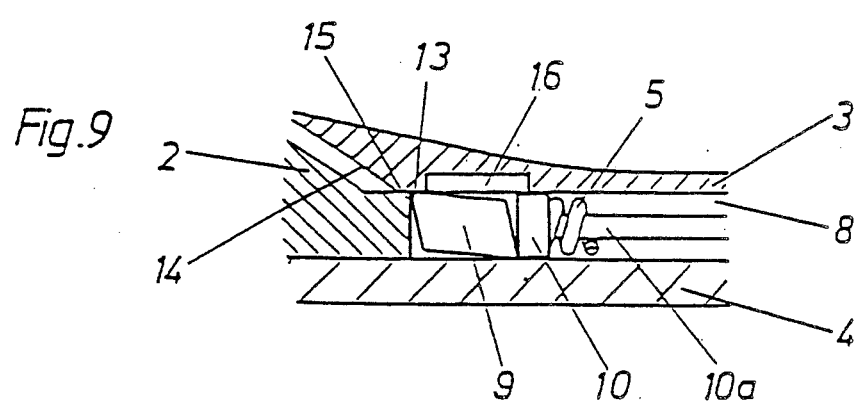
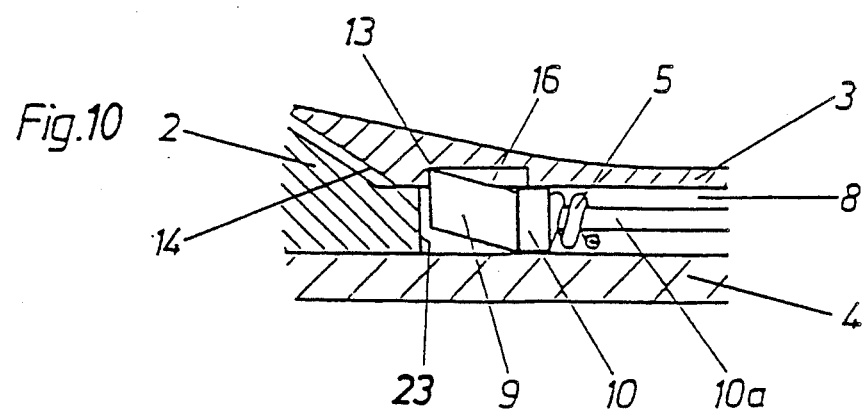

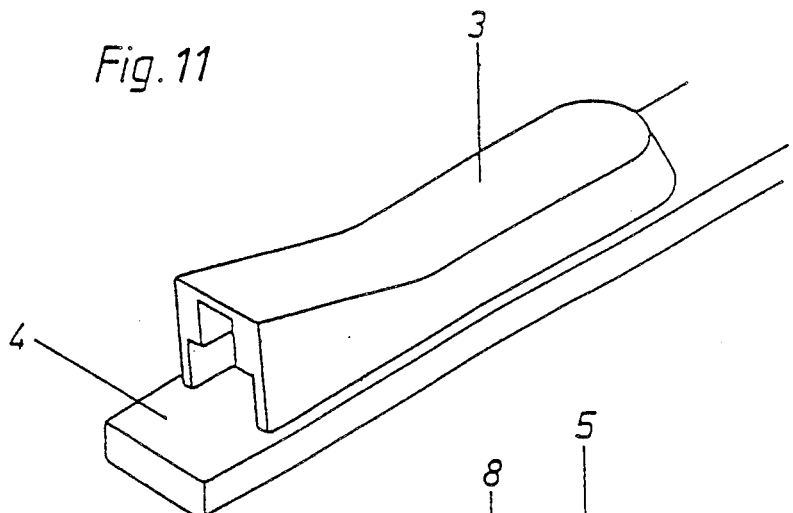
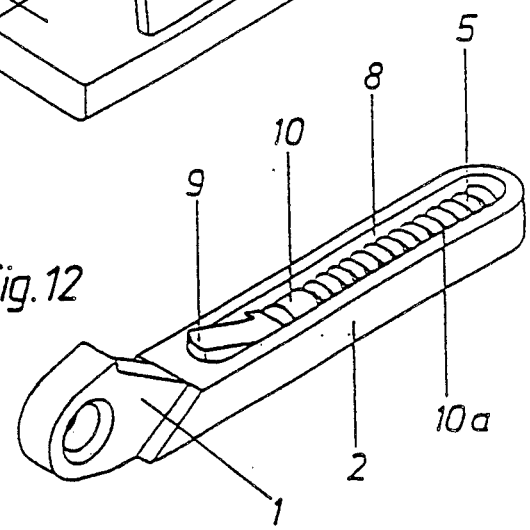
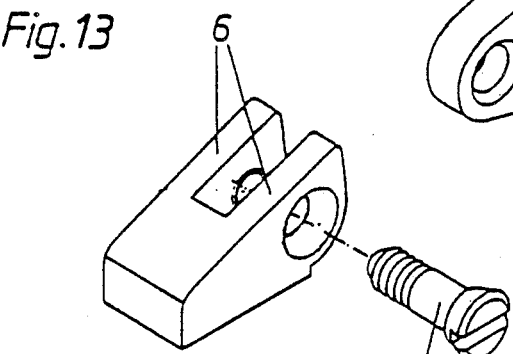
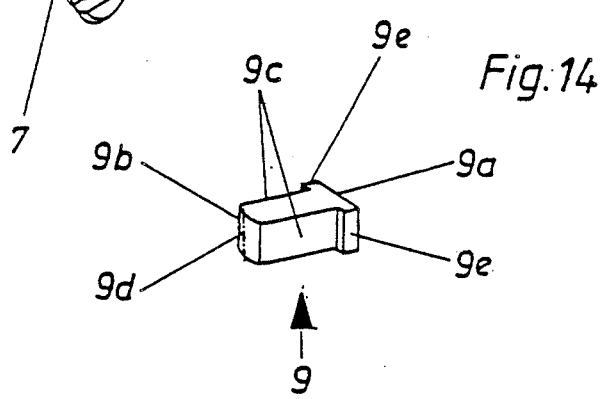

EYEGLASS SPRING HINGES

BACKGROUND OF THE INVENTION

1. Field of the Invention

This invention relates to eyeglasses comprising spring hinges permitting the bows of the eyeglasses to be swung out beyond a position defined by stops so that the bows will resiliently engage the head of the wearer and optionally providing for a snap action between the swung-in and swung-out positions of the bows, wherein each of said hinges comprises a bow-side hinge member that is connected to one of the bows and a rim-side hinge member that is connected to the rim of the eyeglasses and hinged to said bow-side hinge member. The bow-side hinge member is provided with a slider, which contains a spring and extends in a guide housing provided at the inner end of the bow, and an abutment consisting of a loosely mounted locking member is provided for the spring.

2. Description of the Prior Art

Eyeglasses of the kind described hereinbefore are known, e.g., from German Patent Specifications 21 15 596 and 22 42 044. In accordance with the former, the spring abutments consist of locking members which are screw-connected to the bottom of the guide housing. The latter discloses spring abutments consisting of locking members provided with a detent ball. In either case, the locking member cannot be held in its operative position before the small fixing screw has been screwed in between the eyes of the rim-side and bow-side hinge members or the small ball has been inserted to lock itself. Said screw and said ball for retaining the locking member are so small that their insertion requires manual skill. German Patent Specification 22 38 730 discloses a locking member which consists of an end block, which is provided with a pin that is inserted into a blind bore in the bottom of the guide in order to anchor that block. Special skill is also required for inserting that block.

In the hinge disclosed in Published German Application 32 13 174 at least two operations are required to lock the hinge. Just as the hinges disclosed in Published German Applications 29 20 055 and 34 01 213 the hinge disclosed in Published German Application 32 13 174 cannot be supplied as a preassembled unit with an inserted locking member to eyeglass manufacturers so that the hinge cannot easily be assembled.

SUMMARY OF THE INVENTION

It is an object of the invention to provide eyeglasses which are of the kind described first hereinbefore and in which each hinge comprises a slider, which is adapted to be inserted into a receptacle provided at the inner end of the associated bow and to be held in said receptacle after said slider has been preassembled with a spring-biased plunger, an associated spring and a locking member.

It is another object of the invention to provide for use in said eyeglasses a preassembled unit consisting of such slider, spring-biased plunger, spring and locking member.

It is another object of the invention to provide eyeglasses which are of the kind described first hereinbefore and in which said hinges are snap-action hinges.

In eyeglasses which are of the kind described first hereinbefore that object is accomplished in accordance with the invention in that the locking member is formed at both ends with beveled surfaces, one of which engages the spring-biased plunger and the other engages the slider at the forward end of the slot in the preassembled unit so that the wedge-shaped forward end portion of the locking member protrudes from the slider under spring pressure. During the assembling of the eyeglasses the slider is inserted into the guide housing and the locking member is depressed into the slider for the spring by means of a beveled surface of the guide housing, until the forward end of the locking member has reached a recess in the housing so that said locking member than snaps into said recess. The locking member is rectangular in cross-section and oval in a top plan view and parallelogram-shaped in vertical longitudinal section and has oval top and bottom surfaces and has two parallel beveled end faces. The spring is held in the slider in a slot, through which the locking member, the spring-biased plunger and the spring can be inserted to form a preassembled unit.

In another embodiment of the invention the locking member is T-shaped in a top plan view, the beveled rear end face of the locking member is planar and engaged by the spring-biased plunger and the beveled forward end face of the locking member is curved in horizontal section and adapted to snap into a recess of the guide housing. Because the planar beveled end face snugly engages the planar end face of the cylindrical or parallelepipedic plunger, the locking member will assume an oblique locking position under the force of the spring and will effectively be guided.

The locking member is desirably slightly narrower than the slot in the slider so that the raising of the locking member into the recess will be facilitated because the curved beveled forward end face contacts the slider and the guide housing only at one generatrix. As a result, a friction on the sides of the locking member as it is raised under spring action will reliably be avoided, regardless of any tolerances, and friction will occur only at the curved beveled forward end face at its generatrix which in in contact with the slider and the guide housing.

The locking member may be rectangular in cross-section and on opposite sides of its beveled rear end face which engages the end face of the spring-biased plunger may be provided with two shoulders, which permit the locking member to be suspended as it is supplied for an automatic preassembling operation. In that case the parts of the preassembled unit can automatically be assembled.

BRIEF DESCRIPTION OF THE DRAWING

FIGS. 4 and 5 are, respectively, a central sectional view and a longtudinal sectional view showing the spring hinge in its open position with the bow end portion, bow-side hinge member and rim-side hinge member.

FIGS. 6 and 7 are central sectional views like FIG. 4 and show the hinge in its forcibly swung-out position and in its stop-defined open position, respectively.

FIGS. 8, 9 and 10 are fragmentary central sectional views showing a part of the spring-biased hinge during several phases of the snap-in action of the locking member.

FIG. 11 is a perspective view showing a second embodiment of a bow end portion provided with a housing for guiding the slider of the bow-side hinge member.

FIG. 12 is a perspective view showing for the embodiment of FIG. 11 the eye of the bow-side hinge member and the slider containing the locking member, spring-biased plunger and spring.

FIG. 13 is a perspective view showing for the embodiment of FIG. 11 the rim-side hinge member with a snap-action cam and the hinge screw.

FIG. 14 is a perspective view showing a locking member which is improved over that of the first embodiment.

DETAILED DESCRIPTION OF THE PREFERRED EMBODIMENTS

Figure 1:
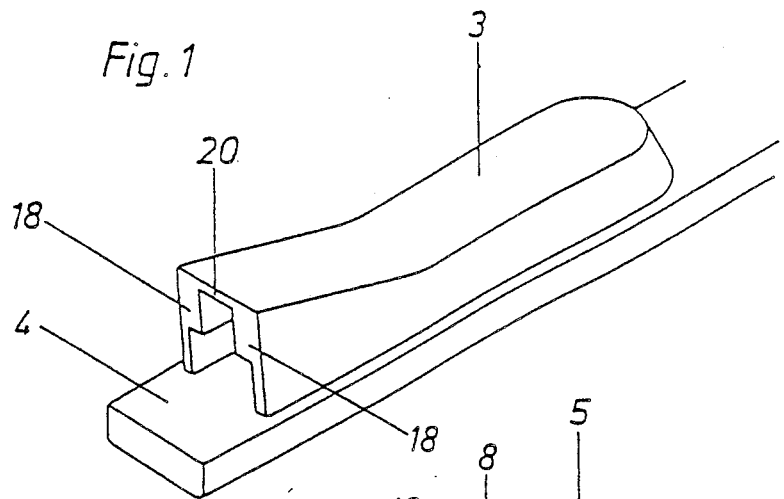
FIG. 1 is a perspective view showing a first embodiment of the hinge together with the bow end portion provided with a guide housing for receiving the slider connected to the bow-side hinge member.

Two preferred embodiments of eyeglasses according to the invention will now be described more in detail with reference to the drawing.

Figure 2:
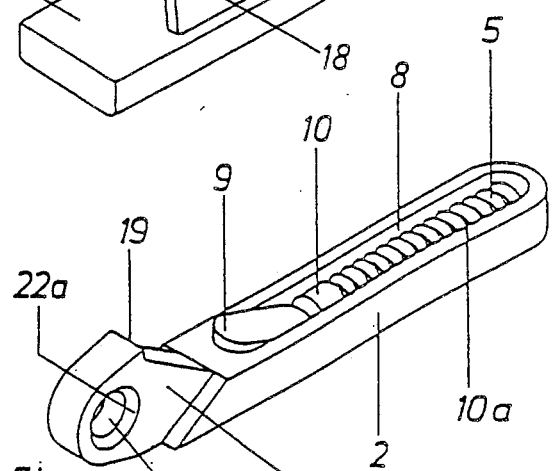
FIG. 2 is a perspective view showing the eye of the bow-side hinge member and the slider containing the locking member, spring-biased plunger and spring.
Figure 3:
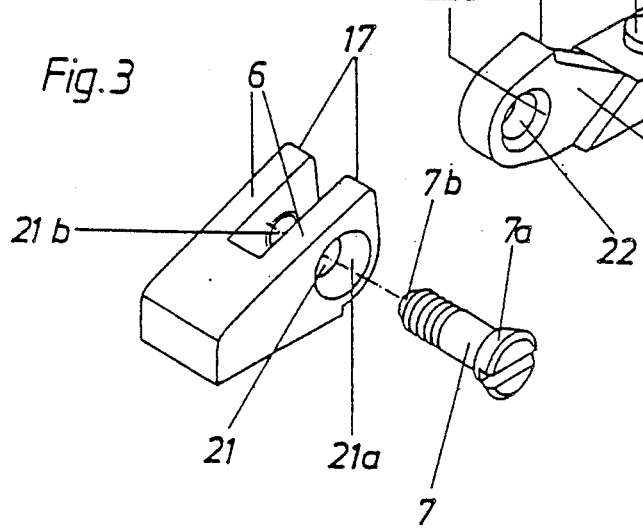
FIG. 3 is a perspective view showing the rim-side hinge member with a snap-action cam and the hinge screw.

In the first embodiment shown in FIGS. 1 to 10 a spring hinge for eyeglasses comprises a bow-side hinge eye 1, which is provided with a slider 2, which is slidably mounted in a guide housing 3 provided at the forward end portion 4 of a bow and is adapted to be extended from said guide housing 3 against the action of a coiled compression spring 5. Each hinge comprises a rim-side hinge member having two eyes 6, which contact the bow-side hinge eye 1 on opposite sides. The hinge eyes 1 and 6 are pivotally connected by a hinge screw 7. The guide housing 3 may be soldered to the bow end portion 4 if the bow consists of metal and may be soldered to a metal insert provided in a bow consisting of plastic. A spring receptacle is constituted by a slot 8, which is formed in the slider 2. To provide the preassembled unit shown in FIG. 2, a locking member 9, a spring-biased plunger 10 connected at the rear to a rod 10a and the spring 5 are inserted into the slot 8. The resulting preassembled unit is inserted into the guide housing 3 on the bow end portion 4 as shown in FIG. 1 and the hinge eyes 1 and 6 can then be connected by the hinge screw 7 as is shown in FIGS. 2 and 3. In this embodiment the locking member 9 is generally rectangular in cross-section and is provided at both ends with beveled end faces 11 and has oval top and bottom surfaces 12 so that the locking member has in a top plan view the oval shape apparent from FIG. 4 and has in vertical longitudinal section the shape of a parallelogram as is apparent from FIG. 4 and has in a top plan view the oval configuration shown in FIG. 5. When the locking member 9 is disposed in the preassembled unit in the slot 8 of the slider 2, the forward end portion 13 of the locking member 9 bears on the slider 2 at the forward end of the slot 8 and protrudes from the slider 2 out of the slot 8. As the slider 2 is inserted into the guide housing 3 said protruding foward end portion 13 will be depressed by the beveled inside surface 14 of the guide housing 3 against the force of the spring 5 so that the top surface of the locking member 9 extends temporarily in the guiding plane 15 defined by the top inside surface of the guide housing 3 between the surface 14 and the recess 16. As the slider 2 is further inserted to the guide housing 3, the locking member 9 will reach the recess 16 that is formed in the top inside surface of the guide housing 3 and under the action of the compression spring 5 the spring-biased plunger 10 engaging the beveled rear end face 11 of the locking member 9 will cause the end portion 13 to snap into the recess 16, as is shown in FIGS. 8 and 10.

When the hinge is locked in the position shown in FIG. 4, the hinge can forcibly be swung open in known manner beyond a stop-defined position to the position shown in FIG. 6 and can then resiliently bear on the head of the wearer. For that enforced movement the slider 2 connected to the bow-side hinge eye 1 is extended from the guide housing 3 at the bow end portion 4 whereas the rim-side hinge eyes 6 remain stationary.

For an improved guidance of the cams 17 provided on the rim-side hinge eyes 6 during their snap-action movement, the guide housing 3 is provided at its open forward end with two inwardly beveled end shoulder 18, which will effect a snap action during the movement of the bow from the swung-in position to the open position, as is shown in FIG. 1.

The bow-side hinge eye 1 is provided adjacent to the extensible slider 2 with a nose 19, which limits the insertion of the slider 2 into the guide housing 3 during the final assembling of the hinge in that said nose 19 engages the web 20 at the inner end of the guide housing 3 after a slight overtravel of the slider 2 into the guide housing 3 permitting the forward end portion 13 of the locking member 9 to snap into the recess 16.

The hinge screw 7 is inserted into two bores 21, which are formed in the rim-side hinge eyes 6. One of said bores 21 has a conical surface 21a for receiving a mating conical head 7a of the screw 7, as is dsclosed in German Utility Model 89 04 802.4. The other bore 21 is formed with screw threads 21b for the screw 7. The bow-side hinge eye 1 is formed with a bore 22, which serves to receive the hinge screw and has funnel-shaped countersinks 22a at both ends. The hinge screw 7 has a frustoconical free end portion 7b that is a snug fit in one of the countersinks 22a in dependence on whether the hinge is used for a left-hand or right-hand bow. As a result, the bow-side hinge eye 1 will be centered relatively to the previously offset rim-side hinge eyes 6 and the slider 2, will slightly be extended from and prestressed toward the housing 3 to eliminate backlash and will define a gap 23 with the locking member 9 which is locked in the recess 16.

In the second embodiment shown in FIGS. 11 to 14 the spring hinge for eyeglasses also comprises a bow-side hinge eye 1, which is provided with a slider 2, which is slidably mounted in a guide housing 3 provided at the forward end portion 4 of a bow and is adapted to be extended from said guide housing 3 against the action of a coiled compression spring 5. Each hinge comprises a rim-side hinge member having two eyes 6, which contact the bow-side hinge eye 1 on opposite sides. The hinge eyes 1 and 6 are pivotally connected by a hinge screw 7. The guide housing 3 may be soldered to the bow end portion 4 if the bow consists of metal and may be soldered to a metal insert provided in a bow consisting of plastic. A spring receptable is constituted by a slot 8, which is formed in the slider 2. To provide the preassembled unit shown in FIG. 2, a locking member 9, a spring-biased plunger 10 connected at the rear to a rod 10a and the spring 5 are inserted into the slot 8. The resulting preassembled unit is inserted into the guide housing 3 on the bow end portion 4 as shown in FIG. 1 and the hinge eyes 1 and 6 can then be connected by the hinge screw 7 as is shown in FIGS. 12 and 13.

As is specifically apparent from FIG. 12 the locking member 9 is rectangular in cross-section and is T-shaped in a top plan view. It has at its rear end a planar beveled end face 9a, which is engaged by the forward end face of the spring-biased plunger 10. The plunger 10 may be cylindrical or may also be rectangular in cross-section. The forward end portion of the locking member 9 is formed with a beveled end face which is curved in horizontal section and just as the forward end portion of the locking member 9 of the first embodiment shown in FIGS. 1 to 10 will snap into a recess formed in the top inside surface of the guide housing 3. That recess corresponds to the recess 16 of the first embodiment and is not shown in FIGS. 11 to 14. The locking member 9 is somewhat narrower between the side faces 9c—9c than the slot 8 so that a friction on said side faces 9c—9c will be avoided within a specified tolerance and the forward end portion of the locking member 9 will contact the slider 2 and the forward end face of the recess in the guide housing 3 only at the rising generatrix 9d of the forward end face 9b. At its rear end, the locking member 9 is formed on opposite sides of the end face 9a with two shoulders 9e, which slightly protrude laterally and permit the locking member 9 to be suspended as it is fed for the automatic assembling to provide the above-described preassembled unit.

It is apparent that the guide housing 3 extends along the forward end portion 4 of the bow and has at the forward end of the recess 16 a rearwardly facing interior stop face. The slider 2 is elongate and is rigid with the bow-side hinge eye 1 and is longitudinally slidably mounted in the housing 3. The plunger 10 is longitudinally slidably mounted in the longitudinal slot 8 of the slider 2 behind said stop face. The prestressed coiled compression spring 5 extends in the slot 8 behind the plunger 10 and bears on the slider 2 at the rear end of the slot 8 and urges the plunger 10 forwardly in the slot 8. The locking member 9 is held in the slot 8 between the plunger 10 and said stop face and is urged by the plunger 10 against said stop face under the force of the spring 5 so that the slider 2 is extensible out of the housing 3 against the force of the spring 5.

The slot 8 has a closed rear end and is open to the recess 16. A beveled rear end face 11 of the locking member 9 is engaged by the plunger 10 and extends at such an angle that the plunger 10 bearing on the rear end face 11 under the force of the spring 5 is arranged to urge the forward end portion 13 into the recess 16.

The preassembled unit constituted by the slider 2, the locking member 9, the plunger 10 and the spring 5 is adapted to be inserted into the housing 3 in such an orientation that the forward end portion 13 protrudes from the slot 8 on the slide of said unit which faces the recess 16. Forwardly of the recess 16 the housing is formed with a rearwardly and inwardly inclinded interior surface 14 for depressing the forward end portion 13 of the locking member into the slot 8 as said unit is inserted in said orientation into the housing 3 until the forward end portion has moved past the stop face of the recess 16 and is then urged out of the slot 8 into the recess 16 by the plunger 10 under the force of the spring 5.

Each of the rim-side hinge eyes 6 is provided with a cam 17, which faces the open forward end of the housing 3. The housing 3 is provided at its open forward end with inwardly beveled shoulders 18 facing said cams 17 and arranged to cooperate with said cams 17 for a snap action under the force of the spring 5 during a predetermined pivotal movement of said bow relative to the rim-side hinge eyes 6 in that the slider 2 is temporarily extended from the housing 3.

The housing 3 is provided at its forward end with an end web 20 facing the rim-side hinge eyes 6 and the bow-side hinge eye 1 is provided adjacent to the slider 2 with a nose 19, which is adapted to cooperate with the end web 20 as to limit the insertion of the slider into the housing 3.

The slot 8 in the slider has a forward end face, which is arranged to be engaged by the forward end face 11 of the locking member 9 under the force of the spring 5 in the preassembled unit when it has not been inserted into the housing 3. The plunger 10 is connected at it rear to a rod 10a, which extends longitudinally in the spring 5 and is engageable with the slider 2 at the rear end of the slot 8 to limit the extension of the slider 2 out of the housing 3.

I claim:
1. In an assembly for use in eyeglasses, which assembly comprises
    a bow having a forward end portion provided with a guide housing, which extends along said forward end portion and has a rearwardly facing interior stop face,
    a rim-side hinge member,
    a bow-side hinge member, which is hinged to said rim-side hinge member,
    an elongate slider, which is rigid with said bow-side hinge member and is longitudinally slidably mounted in said housing,
    a plunger, which is longitudinally slidably mounted in said slider behind said stop face,
    a prestressed compression spring longitudinally extending in said slider behind said plunger and urging said plunger forwardly in said slider, and
    a locking member, which is held in said slider between said plunger and said stop face and is urged by said plunger against said stop face under the force of said spring,
    whereby said slider is extensible out of said housing against the force of said spring,
    the improvement residing in that
    said housing is formed in its interior with a recess, which has a forward end face which constitutes said stop face,
    said slider is formed with a longitudinal slot, which has a closed rear end and is open toward said recess and contains said locking member, said plunger and said spring,
    said locking member has a wedge-shaped forward end portion having a beveled forward end face and protruding from said slot into said recess, and
    said locking member has a beveled rear end face which is engaged by said plunger and extends at such an angle that said plunger bearing on said rear end face under the force of said spring is arranged to urge said forward end portion of said locking member into said recess.
2. The improvement set forth in claim 1, wherein
    said slider, locking member, plunger and spring are adapted to form a preassembled unit, in which said locking member, said plunger and said spring are arranged in said slot and said forward end portion of said locking member protrudes from said slot, said preassembled unit is adapted to be inserted into said housing in such an orientation that said forward end portion of the locking member protrudes from said slot on that side of said unit which faces said recess, and said housing is formed forwardly of said recess with a rearwardly and inwardly inclined interior surface for depressing said forward end portion of said locking member into said slot as said unit is inserted in said orientation into said housing until said forward end portion of said locking member has moved past said stop face and is then urged out of said slot into said recess by said plunger under the force of said spring.

3. The improvement set forth in claim 2, wherein
said housing is provided at its forward end with an end web and said bow-side hinge member is provided adjacent to said slider with a nose, which is adapted to cooperate with said end web so as to limit the insertion of said slider into said housing.

4. The improvement set forth in claim 2, wherein said slot has a forward end face, which is arranged to be engaged by said forward end face of said locking member under the force of said spring in said preassembled unit when it has not been inserted into said housing.

5. The improvement set forth in claim 1, wherein said locking member is rectangular in cross-section and parallelogram-shaped in vertical longitudinal section and has oval top and bottom surfaces.

6. The improvement set forth in claim 1 as applied to an assembly in which said rim-side hinge member comprises two spaced apart, parallel rim-side hinge eyes and said bow-side hinge member comprises a bow-side eye extending between and hinged to said rim-side hinge eyes, wherein each of said rim-side hinge eyes is provided with a cam facing said open forward end of said housing and said housing is provided at said open forward end with inwardly beveled shoulders facing said cams and arranged to guide said cams for a snap action under the force of said spring during a predetermined pivotal movement of said bow relative to said rim-side hinge member.

7. The improvement set forth in claim 1 as applied to an assembly in which said rim-side hinge member comprises two spaced apart, parallel rim-side hinge eyes and said bow-side hinge member comprises a bow-side eye extending between and hinged to said rim-side hinge eyes, each of said eyes is formed with a bore and a hinge screw for hingedly connecting said bow-side hinge eye to said rim-side hinge eyes extends in said bores, wherein said bore in said bow-side hinge eye has a countersink, said screw is adapted to be inserted into said bore in one of said rim-side hinge eyes when said bores in said bow-side hinge eye is offset from said bores in said rim-side hinge eyes and said screw is adapted to subsequently engage said countersink to center the bore in said bow-side hinge eye whereby said slider is extended out of said housing against the force of said spring to eliminate backlash.

8. The improvement set forth in claim 1, wherein said spring consists of a coil spring bearing on said plunger and on said slider at said rear end of said slot, said plunger is connected at its rear to a rod, which extends longitudinally in said spring and is engageable with said slider at said rear end of said slot to limit the extension of said slider out of said housing.

9. The improvement set forth in claim 1, wherein said locking member has a flat beveled rear end face and has a beveled forward end face which is curved in horizontal section.

10. The improvement set forth in claim 9, wherein said forward end face of said locking member has a single generatrix in contact with said stop face.

11. The improvement set forth in claim 10, wherein said locking member is narrower than said slot in said slider.

12. The improvement set forth in claim 11, wherein said locking member is formed on opposite sides of said beveled rear surface with laterally protruding shoulders.

13. The improvement set forth in claim 10, wherein said locking member is formed on opposite sides of said beveled rear surface with laterally protruding shoulders.

14. The improvement set forth in claim 9, wherein said locking member is formed on opposite side of said beveled rear surface with laterally protruding shoulders.

15. The improvement set forth in claim 1, wherein said locking member is narrower than said slot in said slider.

16. The improvement set forth in claim 1, wherein said locking member is formed on opposite sides of said beveled rear surface with laterally protruding shoulders.

17. A preassembled unit for use in an assembly comprising a bow having a forward end portion provided with a guide housing, which extends along said forward end portion and has a rearwardly facing interior stop face, a rim-side hinge member, a bow-side hinge member, which is hinged to said rim-side hinge member, an elongate slider, which is rigid with said bow-side hinge member and is longitudinally slidably mounted in said housing, a plunger, which is longitudinally slidably mounted in said slider behind said stop face, a prestressed compression spring longitudinally extending in said slider behind said plunger and urging said plunger forwardly in said slider, and a locking member, which is held in said slider between said plunger and said stop face and is urged by said plunger against said stop face under the force of said spring, whereby said slider is extensible out of said housing against the force of said spring, wherein said housing is formed in its interior with a recess, which has a forward end face which constitutes said stop face, said slider is formed with a longitudinal slot, which has a closed rear end and is open toward said recess and contains said locking member, said plunger and said spring, said locking member has a wedge-shaped forward end portion having a beveled foward end face and protruding from said slot into said recess, and said locking member has a beveled rear end face which is engaged by said plunger and extends at such an angle that said plunger bearing on said rear end face under the force of said spring is arranged to urge said forward end portion of said locking member into said recess,
characterized in that
said preassembled unit comprises said slider, locking member, plunger and spring,
said locking member, plunger and spring are arranged in said slot,
said slot has a forward end face, and
said forward end face of said locking member bears on said forward end face of said slot and protrudes from said slot.

18. A preassembled unit as set forth in claim 17, which comprises also said bow-side hinge member which is rigid with said slider.

* * * * *